Jan. 8, 1952 F. J. KENNEDY 2,581,673
CONTINUOUS METHOD OF MAKING BUTT WELD TUBING
Filed Dec. 27, 1948 7 Sheets-Sheet 1

INVENTOR.
FRANK J. KENNEDY.
BY
his ATTORNEYS.

Jan. 8, 1952 F. J. KENNEDY 2,581,673
CONTINUOUS METHOD OF MAKING BUTT WELD TUBING
Filed Dec. 27, 1948 7 Sheets-Sheet 2

INVENTOR.
FRANK J. KENNEDY.
BY
his ATTORNEYS.

Jan. 8, 1952  F. J. KENNEDY  2,581,673
CONTINUOUS METHOD OF MAKING BUTT WELD TUBING
Filed Dec. 27, 1948  7 Sheets-Sheet 4

INVENTOR.
FRANK J. KENNEDY.
BY
his
ATTORNEYS.

Jan. 8, 1952        F. J. KENNEDY        2,581,673
CONTINUOUS METHOD OF MAKING BUTT WELD TUBING
Filed Dec. 27, 1948        7 Sheets-Sheet 5

INVENTOR.
FRANK J. KENNEDY.
BY
his ATTORNEYS

Jan. 8, 1952     F. J. KENNEDY     2,581,673
CONTINUOUS METHOD OF MAKING BUTT WELD TUBING
Filed Dec. 27, 1948     7 Sheets-Sheet 6

INVENTOR.
FRANK J. KENNEDY.
BY
his ATTORNEYS.

Jan. 8, 1952  F. J. KENNEDY  2,581,673
CONTINUOUS METHOD OF MAKING BUTT WELD TUBING
Filed Dec. 27, 1948  7 Sheets-Sheet 7

INVENTOR.
FRANK J. KENNEDY.
BY
his ATTORNEYS.

Patented Jan. 8, 1952

2,581,673

UNITED STATES PATENT OFFICE 2,581,673

CONTINUOUS METHOD OF MAKING BUTT WELD TUBING

Frank J. Kennedy, Dormont, Pa., assignor to National Electric Products Corporation, Pittsburgh, Pa., a corporation of Pennsylvania Application December 27, 1948, Serial No. 67,526

19 Claims. (Cl. 113—112)

1

This invention relates to making butt weld tubing by the continuous flame weld procedure, this application being a continuation-in-part of my co-pending application Serial Number 623,480, filed October 20, 1945, now abandoned.

In general, tube making procedures of the type here contemplated comprise shaping of flat skelp to a tubular blank form having a seam cleft at its top, heating the metal at the seam edges and then bringing the heated edges into welding engagement with each other, the shaping of the skelp and all other operations on the metal being done while it moves through aligned equipment for performing the operations. The skelp is supplied in the form of coils of steel strip having a width that is suitable for the diameter of the tubing being made. In some cases, the skelp is uniformly heated throughout before it is shaped into a tubular blank, and in other cases it is so shaped at a cold-working temperature. In all cases, the edges of the skelp are finally heated to a welding temperature by projecting flames upon them, usually those from oxyacetylene burners. The heated edges of the blank are brought into welding engagement with each other and the welded tube is cut to desired length by flying saws.

In the prior procedures that have been used for thus making butt weld tubing, the shaping of the skelp, particularly its seam portions, the heating of the seam portions, and various related steps have been such that ragged burrs are formed on the interior of the welded tubing, and various steps of the procedures have been such that the tubing has not been made at an economically high rate of production. In some cases, particularly when the tubing is used as electric conduit, ragged interior burrs are highly objectionable because they cut or abrade the insulation on electrical conductors that are carried by the conduit, and are necessarily pulled or fished through it. While interior burrs may be removed from tubing, their removal adds materially to the cost of manufacture and is absolutely impractical at economical production speed.

The object of this invention is to provide a continuous method of making butt weld tubing by the flame weld procedure in which the shaping of the skelp from its flat to its tubular form for welding, and the heating and welding of the skelp, are so performed and coordinated that tubing free from prejudicial interior ragged burrs may be economically made at a high rate of production.

The invention will be explained with reference to the accompanying drawings which somewhat diagrammatically illustrate apparatus for practicing it.

The various units of the apparatus shown in elevation in Figs. 1, 4, 6, 10, 13 and 14 are arranged end-to-end in a single line of pass in the consecutive order of those figures of the drawings just stated, and as so arranged they constitute a typical example of a complete line of apparatus for practicing this invention.

In the practice of the invention, tubing is preferably made from rimmed steel skelp having mill edges, but may be made from rimmed steel skelp that is slit to desired widths from wide rimmed strip steel, and may also be made from killed steel skelp. One important advantage in making the tubing from rimmed steel skelp is that rimmed steel strip is the lowest priced strip stock obtainable, and another arises from the character of the rim metal which produces a superior product. Rimmed steel is produced during the casting into ingots of incompletely deoxidized molten steel by so controlling the cooling of the metal that there is formed an outer layer or rim of metal that contains materially less segregations and absorbed gases than the core metal, and is more easily welded than the core metal. In the practice of this invention, the edges of the skelp are so worked, shaped and heated that the rim metal is effectively utilized to produce secure leak-tight weld seams. The invention will first be explained in its applicability to the making of tubing from rimmed steel skelp.

Figure 1:
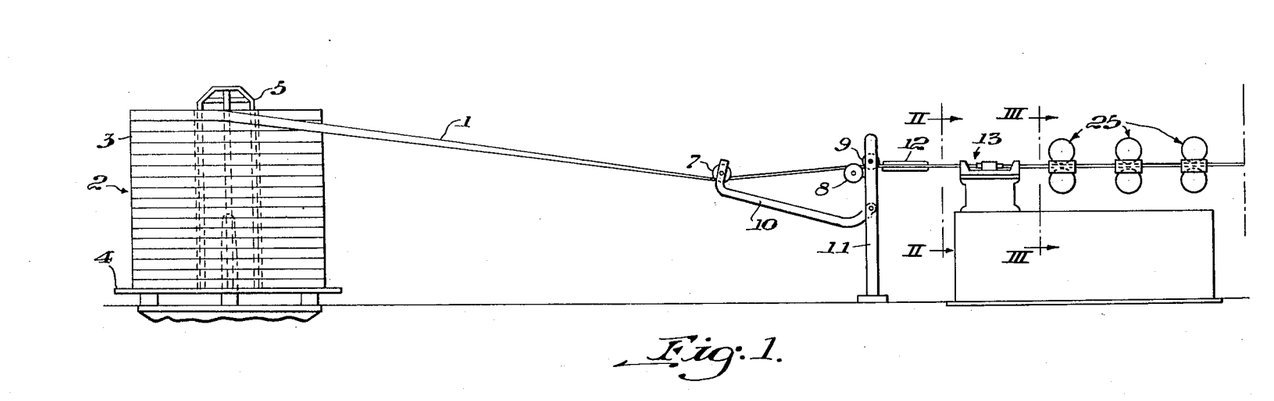
Fig. 1 is an elevation of a stack of coils of skelp, and of vertical rolls following the stack of coils.
Figure 2:
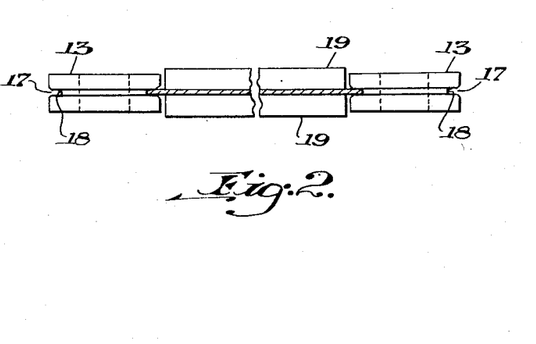
Fig. 2, a face view to enlarged scale of the first stand of rolls, the plane of view being indicated by the line II—II, Fig. 1.

Having reference first to Fig. 1, flat skelp 1 may be supplied from a stack 2 of coils 3 of skelp supported by a table 4 that is freely rotatable on a vertical axis, the coils being held in vertical alignment by a post 5 borne centrally by the table and extending through the centers of the coils. From the top to the bottom of stack 2, the inner end of each coil 3 is attached to the outer end of the coil immediately below it, preferably by welding. To bring the skelp to the line of pass as it is drawn from the coils by the driven forming or shaping rolls, it may pass through a series of idle flanged spools 7, 8 and 9, spool 7 being rotatably supported by the outer end of an arm 10 whose inner end is pivotally attached to a bracket 11. Kinks are removed from the skelp by drawing it between a pair of flattening plates 12, from which it passes through a pair of rolls 13 that are shown to enlarged scale in Fig. 2. The drawing of the skelp from the coils and through the flattening plates, as well as through rolls presently to be explained, is done by driven blank-forming or shaping rolls.

Figure 16:
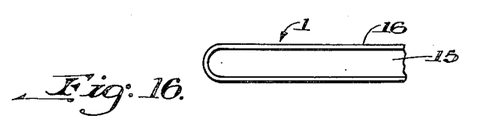
Fig. 16, a transverse sectional view to a materially enlarged scale of a portion of rimmed steel skelp having convexly rounded mill edges.

In the practice of this invention, flat rimmed steel skelp is reduced at a cold-working temperature to a uniform width while the faces of the strip adjacent to its edges are confined against substantial thickening of the metal and against the formation of edge fins which ultimately result in the production of an interior burr on the tubing. Mill edge skelp of this type may vary in width up to about one-tenth of an inch, in view of which it is necessary to reduce the skelp to a uniform width. As shown to materially exaggerated scale in Fig. 16, rounded mill edge skelp 1 of rimmed steel comprises a core 15 and an outer layer or rim 16 that envelopes both the faces and the edges of the skelp. The skelp is reduced to uniform width chiefly by a pair of rolls 13 shown particularly in Fig. 2, each of which is provided with a peripheral groove 17 that preferably has a concavely rounded base or bottom 18. Because the width of the groove in a direction parallel to the axis of each of these rolls is only slightly greater than the thickness of the skelp, the grooves confine the faces of the skelp against substantial thickening of the metal at and adjacent to its edges and against the formation of edge fins. The main body of the skelp between the adjacent faces of rolls 13 is confined against buckling by upper and lower plates 19, which form between their adjacent faces a slot that is slightly larger than the thickness of the skelp.

Figure 3:
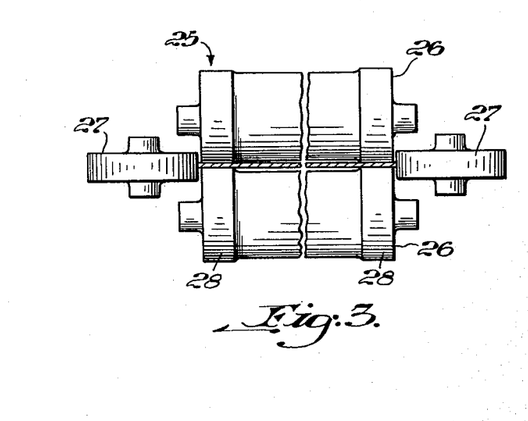
Fig. 3, a face view to enlarged scale of a Turkshead stand of rolls, the plane of view being indicated by the line III—III, Fig. 1.
Figure 17:
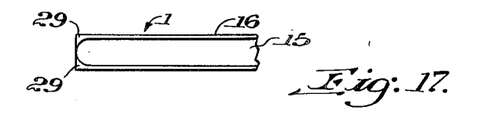
Fig. 17, a view similar to Fig. 16 showing the edge of the skelp after it has been flattened in the stands of Turks-head rolls.

The major reduction in the width of the flat skelp is done in the manner just explained. Thereafter, the convex rounded edges of the skelp are flattened and the skelp is reduced to uniform width by edge rolling the skelp in planes at right angles to its faces, and in doing so the rim metal of the skelp is advantageously concentrated at its edge corners. This is done preferably by pulling or drawing the skelp through three groups 25 of Turks-head rolls that are shown particularly in Fig. 3. Each group comprises upper and lower horizontal rolls 26 which engage the faces of the skelp, and a pair of cylindrical vertical rolls 27 which engage its edges. In the width reduction of the skelp by the rolls 13 shown in Fig. 2, there is usually some thickening (approximately 0.004 of an inch) of the metal at the edge portions of the skelp due to its being upset edgewise in the grooves of the rolls. This small thickening may be reduced by the horizontal Turks-head rolls, but it is of greater importance in the final width reduction of the skelp to avoid the formation of edge fins. By so adjusting the rolls 13 that they reduce the width of the skelp to within about 0.045 of an inch of the required uniform width, and by using three groups 25 of Turks-head rolls, each pair of the vertical rolls 27 may be adjusted successively to reduce the skelp 0.015 of an inch in width without thickening the edges of the skelp or forming fins on them. The rounded edges of the skelp as it leaves the grooved rolls are flattened by the vertical rolls 27 of the several Turks-head stands, and in doing this, the rim metal 16 at the edges of the skelp is concentrated in the corners of the edges as indicated at 29 in Fig. 17, which materially facilitates subsequent welding of the skelp as hereinafter explained.

Figure 18:
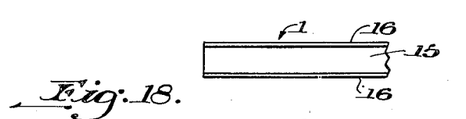
Fig. 18, a transverse sectional view to enlarged scale of a portion of rimmed steel skelp that has been slit from wide strip metal.
Figure 19:
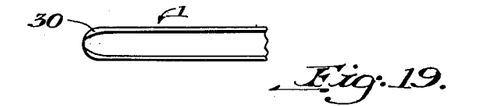
Fig. 19, a view corresponding to Fig. 18 showing the distribution of the rim metal at the corners of the edges after the strip has passed through the rolls shown in Figs. 1 and 2.
Figure 20:
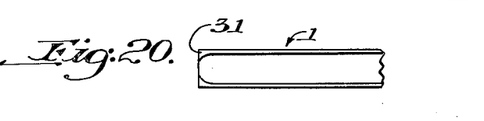
Fig. 20, a view corresponding to Figs. 18 and 19 showing the distribution of the rim metal at the corners after the strip has passed through the Turks-head rolls shown in Figs. 1 and 3.

When slit mill edge skelp is used, the edges are square, as shown in Fig. 18, and the rim metal 16 is only on the faces of the skelp. Such skelp is intentionally slit from strip to widths wider than required, up to about one-tenth of an inch. When it is drawn through the rolls of Fig. 2 to reduce its width in the manner explained with reference to mill edge skelp, the edges are rounded as shown in Fig. 19, and there is some concentration of rim metal at the outer portions of the edges as there indicated at 30. This concentration of rim metal at the corners of the edges is increased when the rounded edges of the skelp shown in Fig. 19 are flattened by drawing it through the Turks-head stands 25 to reduce it to the required uniform width, the concentration of the rim metal at the corners of the strip being indicated at 31 in Fig. 20.

Figure 21:
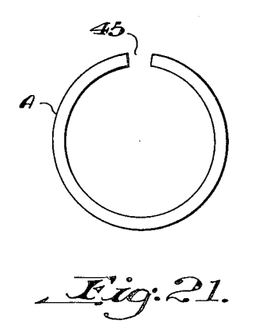
Fig. 21, a transverse sectional view to enlarged scale of the tubular blank as it emerges from the last stand of the shaping rolls shown in Fig. 4.

After the skelp has been reduced to uniform width and its edges shaped in the manner explained, the skelp is bent at a cold-working temperature to a tubular blank form having an open seam cleft of substantial width at its top. This is done by a series of pairs of horizontal driven rolls 35 through 41, shown in Fig. 4, the pair of rolls 41 being shown to enlarged scale in Fig. 5. While various known forms of blank-shaping rolls may be used for this purpose, it is preferred so to shape the passes of them that the bottom half of the tubular blank is of true semi-cylindrical form. By doing so, all further working of the metal of the blank prior to the sizing of the welded tube is done upon the metal in the upper half of the blank, some of which, particularly the seam portions of the metal, is heated to a materially higher temperature than the metal in the lower half of the blank. The shape of the tubular blank as it emerges from the last stands of the series of forming rolls is illustrated in Fig. 21. As there shown, the seam cleft 45 of the blank A is of substantial width to facilitate the preliminary heating of the metal at and adjacent to the seam cleft, the planes of the edges of the blanks being then of V-form.

After the tubular blank is formed, it, and particularly the metal adjacent to its seam edges, is progressively heated in two separate stages, the first being a preliminary heating and the second a weld heating stage. In the first stage the edge portions of the blank are heated to a glowing temperature below the melting point of the steel and the remainder of the blank is heated to a non-glowing temperature by projecting high velocity flames of gaseous fuel downwardly on the edge portions and through the seam cleft. These flames, which are preferably produced in the manner presently to be explained, may have a temperature of approximately 3000° F., and they heat the metal at the edge portions of the blank to a temperature of from about 1200° to about 1800° F., preferably to about 1450° F. The gaseous fuel so used is preferably natural gas, but may be producer gas, water gas, and the like.

Figures 6, 7, 8, 9:
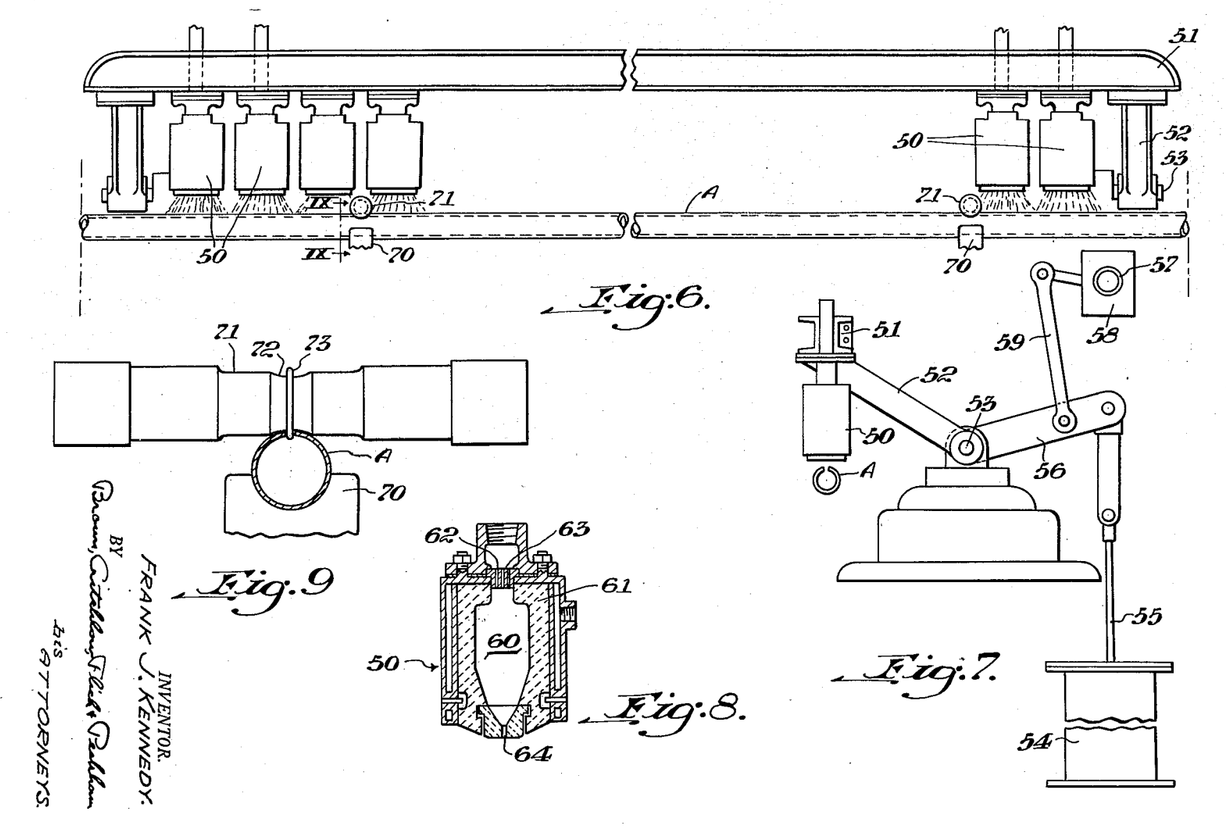
Fig. 6, an elevation of preheating burner mechanism.
Fig. 7, an end view of the preheating burner mechanism.
Fig. 8, a transverse sectional view to enlarged scale of one of a series of aligned preheating burners.
Fig. 9 a face view to enlarged scale of a tube-support and a guiding roll, the plane of view being indicated by the line IX—IX, Fig. 6.

The preliminary heating of the blank may be done by the burner equipment shown in Figs. 6, 7 and 8. A series of fuel gas burners 50 are supported in alignment by a horizontal beam 51 which is attached to the outer ends of rocker arms 52 that are supported at their inner ends by a rock shaft 53 which may be oscillated by pressure-fluid mechanism including cylinders 54 and piston rods 55 connected at their outer ends to arms 56 which in turn are attached to shaft 53. In Figs. 6 and 7, the burners are shown in their lowered operative position for effecting the preliminary heating of the tubular blank A. When it is desired to interrupt the tube-making procedure, as for example when the supply of skelp from a stack 2 thereof has been consumed and another stack is placed on table 4, the pressure-fluid mechanism is actuated to elevate burners 50 so that the tubular blank A will not become overheated during the interval of the change. For automatically reducing the supply of gas to burners 50 when they are thus elevated, a gas supply line 57 may be equipped with a valve 58 whose operating arm is pivotally connected to a link 59 attached to an arm 56, as diagrammatically illustrated in Fig. 7.

Figure 22:
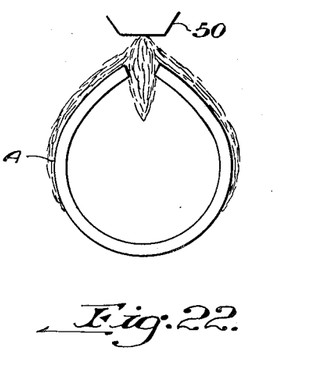
Fig. 22, a transverse sectional view to enlarged scale of the tubular blank as it passes beneath the last of the preheating burners shown in Fig. 6, the general flow of the preheating burner flames being shown in this view.

In the form illustrated in detail in Fig. 8, each burner 50 has a combustion chamber 60 formed by refractory walls 61, to which a gaseous fuel mixture is supplied through an inlet formed by a plurality of small parallel passages 62 in a block 63. At the bottom of the combustion chamber there is a long narrow outlet slot 64 for the escape of the products of combustion in sheet-like form. The mixture for products of combustion enters each burner 50 through its inlet passages 62 and burns within the chamber with the result that its refractory walls 61 become highly heated and hence materially raise the temperature of combustion in the chamber. The burned and burning gases thus heated to a temperature of approximately 3000° F. expand in volume and issue through the outlet slot 64 at a high velocity, the issuing flames being predominantly products of combustion but may contain some unburned fuel gas. As generally indicated in Fig. 22, the high velocity flame from each burner 50 is projected downwardly upon the seam cleft metal, through the seam cleft and around the blank to preliminarily heat its upper portion to the approximate temperatures explained above. The lower portion of the blank is heated to a black or non-glowing temperature of from about 600° to 800° F. During this heating of the blank its upper portions at the sides of the seam cleft thermally expand progressively to somewhat enlarge the seam cleft, as generally illustrated in Fig. 22 which shows the form of the blank as it emerges from the series of preliminary heating burners.

While the tubular blank is progressively heated by burners 50 in the manner explained, it is supported by a series of grooved blocks 70, shown particularly in Fig. 9. Above each block there is an idle roller 71 having a groove 72 that is provided centrally with a disc-like fin 73 which projects through the seam cleft of the blank to maintain the seam cleft in its uppermost position so that heated gases from burners 50 may heat the metal of the blank in the manner explained. The grooves 72 formed in rollers 71 are of a larger radius than that of the tubular blank so that the rollers do not contact with the blank in such a way as to change its shape while it is being preliminarily heated, the purpose of the finned rollers being to guide the tubular blank while it is being heated.

Figure 10:
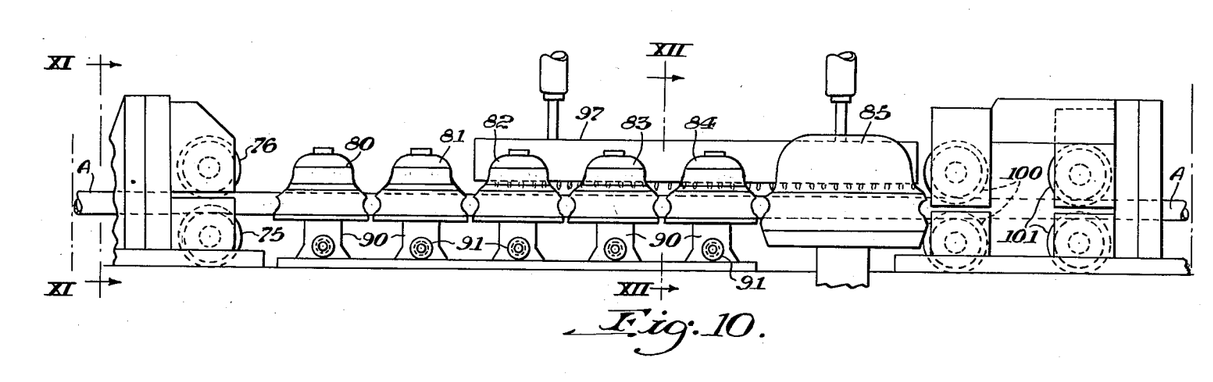
Fig. 10, an elevation to a materially larger scale than Figs. 1, 4 and 6 of a pair of edge-shaping rolls followed by a series of rolls for supporting the tubular blank in the weld heating zone and by pairs of hot sizing rolls.
Figures 11, 12, 13:
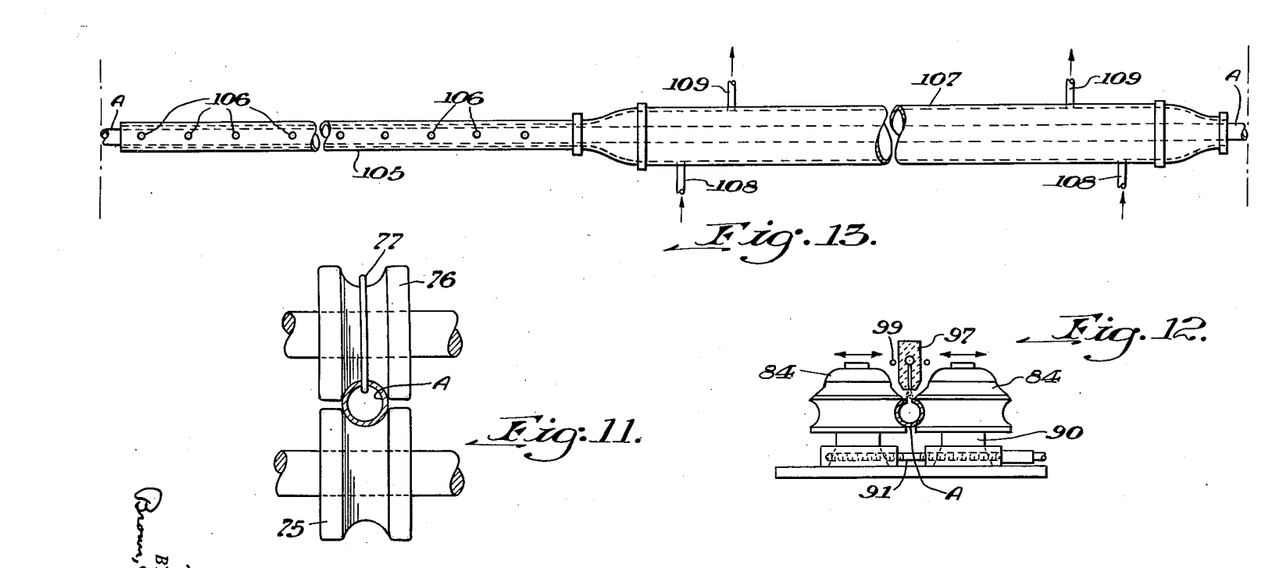
Fig. 11, a face view of the edge-shaping rolls shown in Fig. 10, the plane of view being indicated by the line XI—XI, Fig. 10.
Fig. 12, a face view of one of the pairs of supporting rolls shown in Fig. 10, the plane of view being indicated by the line XII—XII, Fig. 10.
Fig. 13, an elevation of an attenuated tubular casing for cooling the metal of the formed tubing below its critical temperature, followed by an elevation of an attenuated tubular casing for quenching the air cooled tubing.

As the blank emerges from beneath the preheating burners, the portions of its metal adjacent to its seam edges are, as has been stated, at a hot-working temperature of from about 1200° to 1800° F., and the blank having been shaped to tubular form from flat skelp having square edges, its edges lie in planes that intersect in V-form. To heat the metal at the seam edges to a welding temperature in such a way that when the edges are welded a ragged burr will not be formed on the interior of the tubing, the edges are hot-worked to provide them with flat faces that lie in substantially parallel radial planes. Such edge shaping is done by drawing the tubular blank through a pair of horizontal rolls 75, 76, that are shown in Fig. 10, and also to enlarged scale in Fig. 11. Lower roll 75 is provided with a groove that is semi-circular in cross-section having a radius the same as that of the lower half of the tubular blank, and upper roll 76 is provided with a generally similar groove that is interupted medially by a fin 77. The groove in the upper roll is of such shape that it so crowds the metal of the upper portion of the tubular blank against the vertical flat faces of fin 77 that the adjacent faces of the seam edges are shaped to lie in planes that are parallel to each other and substantially radial of the blank. The form of the blank with its edges so hot-worked is shown in Fig. 11.

After the edges of the blank have been thus shaped, the edge metal of the blank is so heated in the second heating stage that the outer corners only of the metal are fused or melted and the remainder of the edge-forming metal is heated to a welding temperature. This heating is effected by subjecting the edge-forming metal of the blank to oxyacetylene flames that are at a materially higher temperature than the flames from burners 50 in the preheating of the blank. These flames burn at high velocity outside of an oxyacetylene nozzle 97 (Fig 10) to which oxygen and acetylene gas are supplied under pressure in the proper relative proportion to effect such substantially complete combustion as to preclude the formation of carbon in an amount sufficient to combine with and detrimentally affect the heated steel, and as to preclude the formation of oxidizing flames which would burn the heated steel. In the proper relative proportion of oxygen and acetylene gas the chemical reaction that occurs when the gases are ignited produces a flame temperature of about 6300° F., which is double the temperature of the flames that normally issue from the preheating burners 50. In that reaction hydrogen is released, but it cannot burn at the high temperature of the flames. Some of it passes through the seam cleft and is burned inside the tubing by the atmospheric oygen in it. Heat is added to that of the welding flames by projecting downwardly jets of compressed air from pipes 99 at the side of nozzle 97, the oxygen of the air combining with the hydrogen outside of the tubing further to heat it as indicated in Fig. 23.

Figure 25:
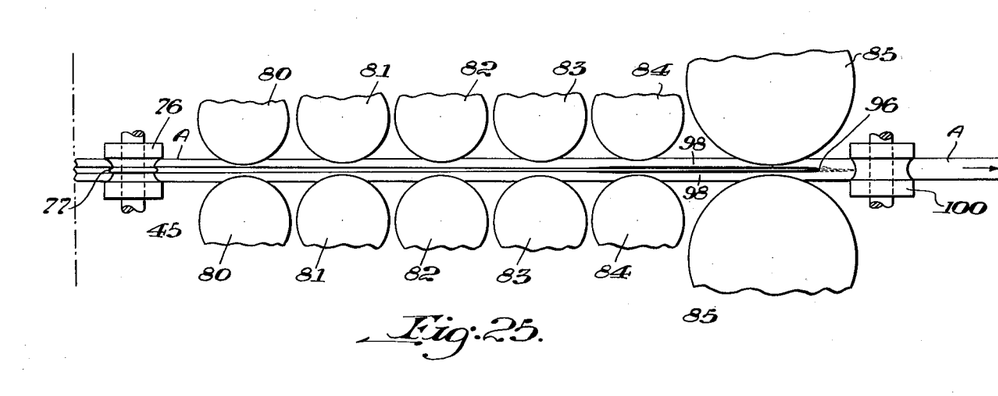
Fig. 25, a plan view of the tubular blank in the weld-heating zone.

While the seam edges of the blank are being finally heated for welding, the blank is positioned between a series of pairs of vertical rolls 80 through 85 that are shown in Fig. 10. The rolls of each of these pairs are rotatably mounted on spindles supported by blocks 90 (Fig. 12) that are engaged by an oppositely threaded rod 91 adapted to be rotated to vary the horizontal width of the pass between each pair of rolls. As shown in Fig. 25, the width of the passes between the several pairs of blank-supporting rolls 80 through 85, are so adjusted that the width of the seam cleft 45 of the blank is gradually narrowed. Furthermore, the gradual narrowing of the seam cleft is such that the full thickness of both edges of the metal is simultaneously brought into welding engagement beyond the last of the supporting rolls, namely the pair of rolls 85, at a position of the traveling blank where it is exteriorly unconfined. Such simultaneous full engagement of the edges of the blank is indicated at 96 in Fig. 25, and by way of example, such point of engagement may be approximately two inches beyond the throat of the pass formed between supporting rolls 85.

Figure 23:
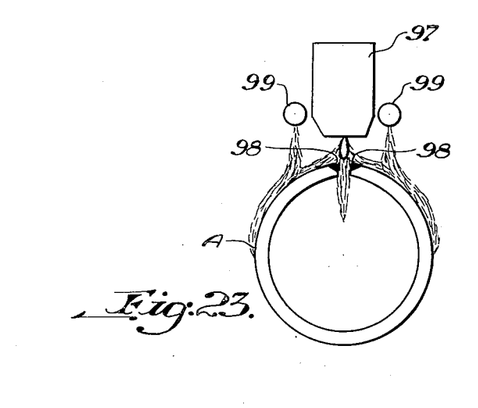
Fig. 23, a transverse sectional view to enlarged scale of the tubular blank after it passes through the edge-shaping rolls shown in Fig. 11 and is beneath the heating burner in the weld-heating zone.

By thus weld-heating the edge-forming metal of the blank by flames from an oxyacetylene nozzle 97 positioned above the pass line between the supporting rolls 80 through 85, and by thus gradually closing the seam cleft 45, the outer corners only of the edges of the blank are fused as indicated at 98 in Figs. 23 and 25, and the remainder of the edge metal is heated to a welding temperature. The metal at the outer corner edges of the blank that is so fused is largely the rim metal that is concentrated at the corners of the skelp, as indicated at 29 in Fig. 17 and at 31 in Fig. 20, such concentration of rim metal having been effected by the edge rolling of the flat skelp in the manner explained.

Figure 24:
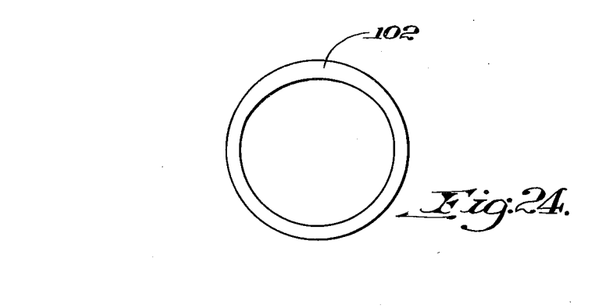
Fig. 24, a sectional view to enlarged scale of the finished tubing.

Beyond the point of weld engagement 96 (Fig. 25) of the weld heated edges of the blank, the closed welded tube is rolled in cylindrical form to effect a preliminary hot sizing of it. This is preferably done by two pairs of horizontal rolls 100 and 101, the first of which engages the tube a short distance beyond the welding point, by way of example about two inches. These pairs of rolls are provided with cylindrical passes which somewhat reduce the size of the blank, this reduction being effected largely by a slight upsetting of the heated metal at the top of the tube, as indicated at 102 in Fig. 24. Because there is no fused metal at the inside corner edges when the seam edges are brought into welding engagement with each other, the upsetting of the metal by the pairs of hot sizing rolls 100 and 101 does not form an interior ragged burr, and any exterior burr of metal that may be formed is smoothed out by the sizing rolls.

At the completion of the welding operation, the metal of the tubing, and particularly its upper portion, is above the critical temperature. The heated tubing is passed through attenuated enclosures first to air cool the portion of the metal that is above the critical temperature and then to quench it by a liquid coolant. As shown in Fig. 13, the air cooling enclosure may be a pipe 105 which is provided with spaced holes 106 for the circulation of air, and the quenching enclosure may be a pipe 107 of larger diameter than pipe 105 and connected to its end. In pipe 105 the metal of the tubing is cooled below its critical temperature and in pipe 107 it is quenched to substantially room temperature by water supplied to the bottom of the pipe through inlets 108 and discharged from the top through outlets 109.

Figure 4:
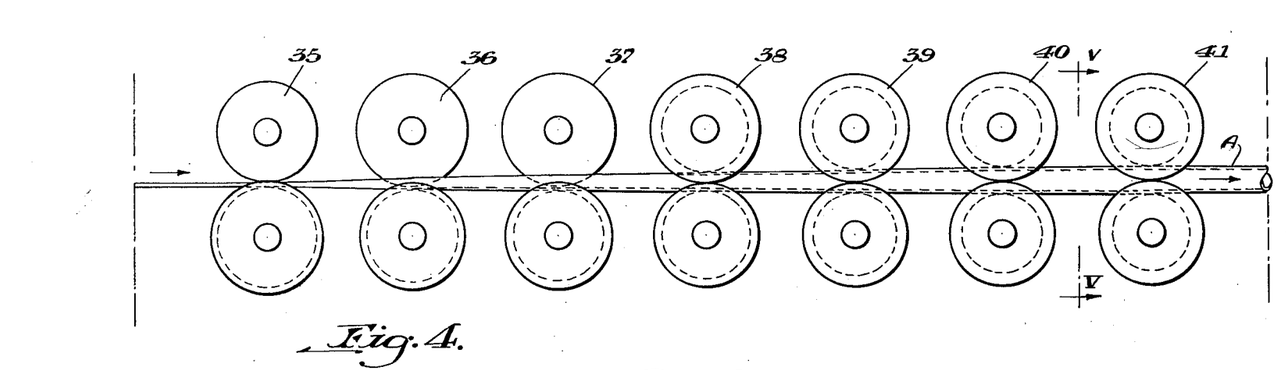
Fig. 4, an elevation of a series of pairs of rolls for progressively shaping flat skelp into tubular blank form with a seam cleft at the top of the blank.
Figure 5:
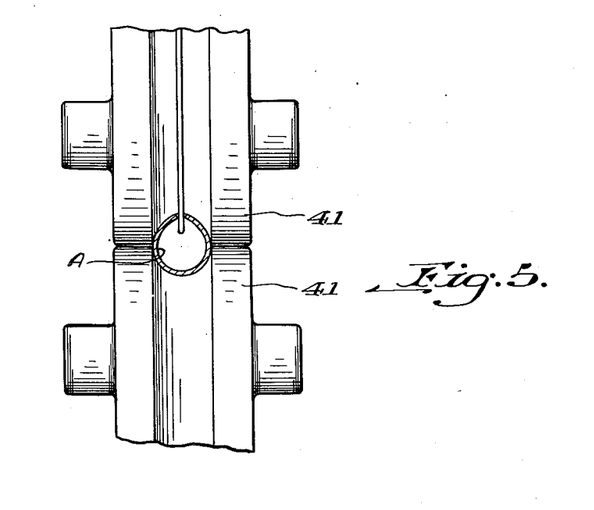
Fig. 5, a view to enlarged scale of the last of the several pairs of skelp shaping rolls, the plane of view being indicated by the line V—V, Fig. 4.

The tubing at substantially room temperature is then passed through a series of pairs of sizing rolls 115 through 118 (Fig. 14) in which the tubing is reduced to desired size. The sizing rolls are driven at such peripheral speeds that they exert a pull upon the tubing that results in its being placed under tensile stress from the time it leaves the last stand of forming rolls 41 (Fig. 4). By thus exerting a pull on the tubing and on the tubular formed blank, the liability of the blank to buckle in the heating and cooling zones is avoided, and the procedure in general is facilitated.

Figure 15:
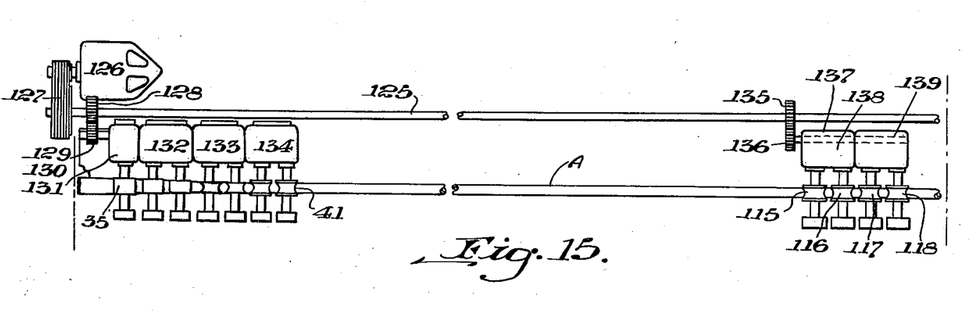
Fig. 15, a plan view of mechanism for driving the skelp-shaping rolls shown in Fig. 4 and the sizing and straightening rolls shown in Fig. 14.

The differential driving of the skelp-forming and tube-sizing rolls to place the tubular blank under tension in the manner explained may be done in the manner generally illustrated in Fig. 15. As there shown, a drive shaft 125 that extends substantially the full length of the tube-making equipment is driven by a motor 126 through V-belts 127. Shaft 125 is provided with a gear 128 that meshes with a gear 129 attached to a shaft 130 that drives gears in boxes 131, 132, 133 and 134, which in turn drive the shafts of the forming rolls 35 through 41. Similarly, shaft 125 is provided with a gear 135 that meshes with a gear 136 attached to a shaft 137 that drives gears in boxes 138 and 139, which in turn drive the shafts of the pairs of sizing rolls 115 through 118. By relative variations in these drives, or by relative variations in the peripheries of the forming and sizing rolls, or by both of them, any desired pull may be applied to the formed tubing by the sizing rolls.

Figure 14:
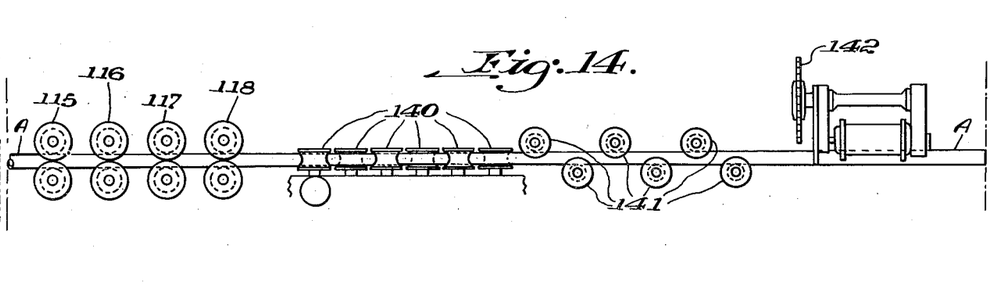
Fig. 14, an elevation of a series of pairs of sizing rolls followed by a series of straightening rolls.

The sized tubing then passes through suitably driven straightening rolls which, as shown in Fig. 14, may consist of a series of alternately arranged vertical rolls 140 followed by a similar series of alternately arranged horizontal rolls 141. Beyond the straightening rolls the tubing is cut into desired uniform lengths by a flying saw 142 that is periodically rocked downwardly to bring the saw into engagement with the tubing as both the saw and tubing move at the same rate of travel.

In the following summary of the method of making tubing herein disclosed, specific data are given for the production of half-inch tubing from rimmed steel skelp about 0.04 of an inch in thickness at the rate of about 300 feet per minute, such data being given by way of example, and not of limitation, because the method is applicable to the making of tubing of different sizes and from skelp of different thicknesses.

Mill edge rimmed steel skelp for making half-inch tubing is about 2.25 inches in width. In the vertical rolls 13 shown in Figs. 1 and 2, the skelp is reduced in width to substantially that required for making the tubing, and in doing so, the edge portions of the skelp are confined in grooves in the rolls which convexly round the edge and prevent the formation of fins on them which would result in forming an interior burr. Following this, the skelp is reduced to the uniform required width by pulling it through the three groups of Turks-head rolls 25 shown in Figs. 1 and 3, each of which reduces the width about .015 of an inch. The vertical rolls 27 of the Turks-heads flatten the rounded edges of the skelp and concentrate the rim metal thereof at its corners as indicated at 29 in Fig. 17, and at 31 in Fig. 20 when slit instead of mill edge skelp is used. Such concentration of rim metal facilitates the weld heating and the welding operations, and materially benefits the weld.

The skelp is then bent at a cold-working temperature to a tubular blank form having an open somewhat flaring seam at its top, this being done by a series of driven shaping and forming rolls 35 through 41. In this forming of the skelp, the bottom half of the blank is shaped to semi-cylindrical form so that the further working of the blank prior to welding its seam is largely upon the metal in its upper half which is more highly heated and hence more easily worked than the metal in its lower half.

The blank is then preliminarily heated, the metal at and adjacent to the edge portions of the blank being heated to a glowing temperature of from about 1200° to 1800° F., preferably to about 1450° F., and the remainder of the metal being heated to a non-glowing temperature of from about 600° to 800° F. by projecting high velocity flames of fuel gas on the edges and through the seam cleft, this being done by moving the skelp below a long series of burners 50 shown in Figs. 6, 7 and 8. The several burners are closely spaced, and each projects downwardly a sheet-like flame of fuel gas composed of products of combustion and a relatively small amount of unburned gas heated to a temperature of about 3000° F., the general effect being that of a substantially continuous sheet-like fuel gas flame throughout the extent of the burners.

As the blank emerges from the preliminary heating burners its adjacent edges are hot-worked to form flat faces on them that lie in substantially parallel radial planes, this being done by passing the blank through a pair of rolls 75, 76, shown in Fig. 11, the upper roll being provided with a fin 77 against which the edges of the skelp are pressed by the rolls to shape the edges in the manner stated. The edges and the edge portions of the blank are then weld heated by projecting on them and through the seam cleft between them high velocity flames that are heated to a temperature materially higher than the preliminary heating flames, the weld heating flames preferably being those from oxy-acetylene nozzle 97 (Fig. 10). The bottom of the nozzle is provided with a plurality of closely-spaced small openings, the general effect being to produce a substantially continuous sheet-like flame having a temperature of about 6300° F.

While the tubular blank is being thus weld heated it is supported by a plurality of pairs of vertical rolls shown in Fig. 10, the gaps between the working faces of the several pairs of rolls being such that, as shown in Fig. 25, the seam cleft 45 of the blank is gradually so narrowed that the parallel edges of the blank come into welding engagement with each other a short distance beyond the last of the vertical supporting rolls, at a place where the blank is laterally unconfined. By thus weld heating the seam edges of the blank, the upper corners only of the edges are melted or fused, and the remainder of the edges are heated to a welding temperature so that, when the edges of the blank are brought together for welding, the fused metal at their outer corners does not form an interior burr on the tubing.

The weld heating of the seam edges is done in a very short interval of time compared with that of the preliminary heating, usually in about one twenty-fifth of the time. The controlled preliminary heating of the blank which is economically effected by fuel gas flames, combined with the gradual narrowing of the seam cleft that then has parallel edges, makes it possible to thus quickly and economically effect the final weld heating in such a way that the weld takes place throughout the width of the edges at a position of the blank where it is laterally unconfined. At that position the seam edges are pressed into welding engagement solely by the stress imparted to the metal to gradually narrow the seam cleft, but such stress is insufficient to upset the metal or to otherwise form an interior burr.

Following the weld heating of the blank and the welding of its faces, as indicated at 96 in Fig. 25 where the blank is unconfined, the blank passes through two pairs of horizontal hot sizing rolls 100 and 101 (Fig. 10) which smooth any fused metal that may be on the exterior of the formed tubing. Thereafter the metal of the tubing that is above the critical temperature is air cooled below that temperature by passing it through a pipe 105 (Fig. 13), and the tubing is then quenched to substantially room temperature by passing it through a pipe 107, connected to pipe 105, to which quenching water is supplied. The cooled tubing is then passed through sizing rolls 115 through 118 (Fig. 14) which are driven at a higher peripheral speed than the forming rolls shown in Fig. 4 so that the tubing and the tubular blank is under tension throughout the heating and cooling zones that follow the forming rolls. The sized tubing is then passed through two series of straightening rolls 140 and 141 and is finally cut in desired length by flying saw 142.

As has been stated, the invention has been described in its applicability to making tubing from rimmed steel skelp, the use of which has the welding, heating and economic advantages that have been explained. In addition to them, the welded rim metal at the seam affords a leak-tight weld which has substantial advantages. In the making of tubing according to this invention from steel skelp, it is unnecessary to edge roll the flat skelp prior to shaping it to tubular form if the skelp is slit to the required width. Except for this, tubing may be made from steel skelp according to this invention by the procedure herein explained.

According to the provisions of the patent statutes, I have explained the principle and mode of procedure of my invention, and the preferred way of practicing it by the use of equipment that is diagrammatically illustrated in the drawings. However, I desire to have it understood that, within the scope of the appended claims, the invention may be practiced otherwise than specifically explained, and by the use of equipment other than that shown in the drawings.

I claim:

1. The method of making butt weld tubing from continuously moving flat, rimmed-steel skelp slit from skelp of greater width, which method comprises convexly rounding the edges of the slit skelp by edge rolling to spread the rim metal from the top and bottom faces of the skelp around the corners toward the mid-region of the edge faces of the skelp, and then cold reducing the flat skelp to uniform width and simultaneously therewith flattening the convexly rounded edges and producing a flow of the rim steel into the corners of the skelp by edge rolling the skelp in planes substantially at right angles to the faces of said skelp, bending the skelp at a cold-working temperature to a tubular blank having an open seam cleft, heating the edges of the seam cleft to a temperature in excess of about 1,200° F. with flames having a temperature of the order of about 3,000° F., and simultaneously therewith heating the portion of the tube blank opposite the seam cleft to a lower temperature that leaves the metal in said portion at a temperature not in excess of about 800° F. and therefore with resilience for effecting control of the seam cleft width as the tube blank travels through successive roll passes, subsequently heating the edges of the seam cleft to a welding temperature as the tube blank passes through said roll passes, and bringing the edges together while at welding temperature.

2. The method of making butt weld tubing from continuously moving flat, rimmed-steel skelp, which method comprises cold rolling the edge portions of the skelp to a convexly rounded edge face and then reducing the skelp to uniform width by applying rolling pressure to the convexly rounded edge faces at opposite edges of the skelp and concentrating rim metal in a corner of the edge by applying the rolling pressure first to a mid-region of the edge face of the skelp and then over a progressively wider band across the width of the edge face as the convexly rounded edge face is flattened, cold forming the flat skelp to a tube blank having an open seam cleft, heating the edges of the blank along the seam cleft to a temperature in excess of about 1,200° F. but below the melting point of the steel, and simultaneously therewith heating the remainder of the blank to a non-glowing temperature by projecting fuel gas flames on the edges and through the seam cleft between them, the temperature of the lower portion of the tubular blank being limited to a value not in excess of about 800° F. so that the metal of the tube remains resilient for better control of the seam cleft width as the tube blank passes through subsequent roll stands, hot-working the edges of the blank to form flat faces thereon that lie substantially parallel to one another, subsequently heating the edges of the cleft to a welding temperature with the edge faces in said confronting parallel relation, and bringing the edge faces together while at a welding temperature.

3. The continuous method of making butt weld tubing as defined in claim 2, and in which the tube blank is formed with a non-circular contour having the distance from the seam cleft to the longitudinal axis of the tube blank greater than the distance from the sides of the tube blank to said axis.

4. The continuous method of making butt weld tubing as defined in claim 2 and in which the tube blank is confined along the region at which the seam edges are being heated to a welding temperature, and the traveling blank is left locally unconfined at the location where the edges come together and along the run of the tube immediately following said location.

5. The method in making butt weld tubing from continuously moving flat, rimmed-steel skelp, which method comprises cold reducing the width of the flat skelp and simultaneously therewith convexly rounding its edges by edge-rolling the skelp, then cold reducing the flat skelp to uniform width and simultaneously therewith flattening the convexly rounded edges of the skelp by edge-rolling them in planes at right angles to the wide faces of the skelp at opposite edges of the skelp and concentrating rim metal in a corner of the edge by applying the rolling pressure first to a mid-region of the edge face of the skelp and then over a progressively wider band across the width of the edge face as the conversely rounded edge face is flattened, bending the skelp at a cold-working temperature to a tubular blank form having an open flaring seam cleft at its top and having its lower half of semi-cylindrical form, heating the edge portions of the blank to a temperature in excess of about 1,200° F. but below the melting point of the steel and simultaneously therewith heating the remainder of the blank to a substantially lower, non-glowing temperature by projecting fuel gas flames on said edge portions and through the seam cleft between them, hot-working only the upper portion of the blank and the adjacent seam edges thereof to form on said edges flat faces that lie in substantially parallel planes, and thereafter melting only the rim metal at the outer corners of the edge portions, where the rim metal was concentrated, while simultaneously heating the remaining depth of the edge faces to a welding temperature by projecting on the edge portions of the blank, and through the seam cleft between them, fuel gas flames having a temperature substantially double that of the fuel gas flames by which the edge portions of the blank were heated, and thereafter bringing the seam edges into contact and maintaining them together, until the weld metal solidifies, by applying pressure against the walls of the tube blank at localized regions ahead of the location where the edges come together, and leaving the tube locally unconfined at the location where the edges come together and along the run of the tube immediately following said location.

6. In the manufacture of butt weld tubing from slit, rimmed-steel skelp by a continuous process in which the flat skelp is formed, the edges heated to a welding temperature, and the edges brought together while at welding temperature, the improvement which comprises forcing rim metal of a wide face of the skelp around and over at least the adjacent portions of the opposite edge faces to produce convexly rounded edges, and then concentrating rim metal in the corners of the edge faces by applying rolling pressure first to the edge faces at some distance from the corners and thereafter to a progessively wider band of the width of the edge faces and nearer to the corners, and reducing the skelp to a uniform width by edge rolling of which the rim metal concentration forms a part, said edge rolling being in planes at right angles to the wide faces of the skelp forming the flat skelp into a tube blank progressively as it comes from the edge-rolling region, preheating the tube blank with low temperature fuel gas flame jets having a temperature of the order of about 3000° F., and then further heating the edge portions of the tube blank with oxy-fuel gas flame jets, and cororelating the speed of the tube blank with the heating of the oxy-fuel gas flame jets, and correlating the speed of the the upper corners of the edge portions of the tubular blank while heating the remaining depth of the edge faces to a welding temperature, and thereafter bringing the edge faces progressively together to make the weld.

7. The continuous method of making butt weld tubing as described in claim 6, in which the adjacent edges of the blank, after being heated by the low temperature fuel gas flame jets, are hot worked to form flat faces that lie substantially parallel to a radial plane that passes through the axis of the tube and through the open seam cleft, and in which the oxy-fuel gas flame jets melt the rim metal at the upper corners of the seam edges and heat the remaining depth of the edge faces to a welding temperature while the confronting edge faces remain substantially parallel to one another.

8. The method of making butt weld tubing from continuously moving flat, slit, rimmed-steel skelp, which method comprises, convexly rounding the edges of the skelp by edge rolling said skelp and forcing rim metal of the top and bottom faces around the corners of the edge faces and at least part way toward the mid-regions of the edge faces of the slit skelp, then cold reducing the flat skelp to a uniform width and simultaneously flattening the convexly rounded edges of the skelp by edge rolling them in planes at right angles to the faces of the skelp and by such edge rolling concentrating rim metal at the edge corners of the skelp, forming the skelp into a tube blank having an open seam cleft and having a transverse cross section with an axis through the seam cleft substantially greater than the length of another axis normal to said axis through the seam cleft, preheating the tube blank with fuel gas flame jets having a temperature of the order of about 3000° to a temperature in excess of about 1200° F. along the edges of the seam cleft and to a lower temperature for the metal of the tube blank opposite the seam cleft, the metal opposite the seam cleft being limited to a temperature not in excess of about 800° F. so that said metal retains some of its original resilience, hot working the heated edges of the tube blank to form flat faces thereon that lie in planes substantially parallel to a common radial plane extending through the seam cleft between the edges, heating the spaced parallel edge faces with fuel gas flame jets having a temperature of the order of double the temperature of the preheating flame jets, correlating the speed of the tube blank with the heat of the high temperature flame jets so as to bring the metal of the edge faces to a welding temperature while the edge faces pass along the region of the high temperature flame jets, and bringing the edge faces together while at a welding temperature.

9. The continuous method of making butt weld tubing as described in claim 8, and in which the rim metal in the upper corners of the seam edges, and only the upper corners, is fused, and the edge faces of the tube blank are brought into contact and held in contact until the fused metal solidifies, such holding being affected by applying pressure against the walls of the tube blank at localized regions ahead of the location where the edges come together, while leaving the tube blank free of localized external restraining force where the edges comes together and along the run of the tube blank immediately following the location where the edges come together, and rolling the welded tube to cylindrical cross section beyond the region at which the weld metal solidifies.

10. The method of making butt weld tubing from continuously moving flat, rimmed-steel skelp having edges slit from a wider width of rimmed-steel skelp, which method comprises cold working the split edges of the skelp to convexly rounded contour and by such cold working bringing metal of the top and bottom faces of the skelp around the corners of the edges and part way toward the mid-portions of the edge faces, cold reducing the width of the flat skelp to a uniform value and simultaneously flattening the convexly rounded edges of the skelp by cold rolling them to concentrate rim metal of the skelp in the edge corners, bending the skelp at a cold working temperature to a tubular blank having an open seam cleft, projecting on the edge portions along the seam cleft and through the seam cleft between said edge portions, fuel gas flame jets having a temperature of the order of 3000° F., correlating the heating with the speed of movement of the tube blank so as to heat the edges of the tube blank to a temperature in excess of about 1,200° F. and the body of the tube blank to a temperature not higher than about 800° F. so that the metal retains resilience for controlling the seam cleft width during subsequent passage to the tube blank through guide rolls, hot working the confronting edges of the tube blank to form flat faces that are substantially parallel to a common radial plane that passes through the seam cleft and through the longitudinal axis of the tube blank, melting the metal of the blank at only the outer corners of the edges and simultaneously therewith heating the remaining depth of the edges to a welding temperature by projecting on said edges and through the seam cleft between them oxy-acetylene gas flames having a temperature of the order of 6300° F., and thereafter bringing the seam edges into contact and holding them together, until the weld metal solidifies, by applying pressure against the outside of the tube blank at localized regions ahead of the location where the edges come together, leaving the tube blank locally unconfined at the location where the edges come together and along the run of the tube immediately following said location, pushing the tube blank through the regions of the low temperature flame jet heating and the oxy-acetylene flame heating and the welding, and pulling the welded tube beyond the welding region by rolling pressure applied to the outside of the tube.

11. In the manufacture of butt weld tubing from continuously moving flat skelp, the method which comprises cold forming the flat skelp into a tube blank having an open seam cleft, preheating the edge portions of the tube blank with fuel gas flames having a temperature of the order of 3000° F., correlating the speed of travel of the tube blank with the heating of the low temperature fuel gas flames so as to heat the edge portions of the tube to a temperature of the order of from 1200° to 1800° F. and the metal of the tube blank opposite the seam cleft to a temperature of the order of 600° to 800° F., and while the tube blank is so heated, hot working the edge portions of the blank to form flat faces thereon substantially parallel to a common radial plane that passes through the longitudinal axis of the tube and through the seam cleft, thereafter heating the edge faces to a welding temperature with high intensity fuel gas flames, and bringing said edge faces into contact while heated to a welding temperature.

12. The welding method described in claim 11, and in which the tube is formed with a non-circular cross section and with its cross-sectional axis through the seam cleft greater than its cross-sectional axis at right angles to said axis through the seam cleft, and the welded tube is hot worked to circular contour by rolls located beyond the region of welding.

13. The continuous method of making butt weld tubing including, in combination, forming flat skelp into a tube blank having an open seam cleft, preheating the tube blank by applying fuel gas flames to the edge portions of the blank, correlating the heating of the edge portions with the speed of longitudinal movement of the tube blank so as to heat the edge portions to a temperature in excess of about 1,200° F. while leaving the body of the tube blank at a substantially lower, non-glowing temperature at which it maintains resilience of the metal, hot working the edge faces beyond the region of preheating, and while the edge portions remain highly heated, to form faces substantially parallel with a common plane through the seam cleft and the longitudinal axis of the tube blank, subsequently heating the substantially parallel edges with high temperature oxy-fuel gas flame jets that heat the edge faces to a welding temperature, bringing the edge faces into contact while at welding temperature, and holding them together, until the weld is made, by applying pressure against the outside of the tube blank at localized regions ahead of the location where the edges come together, and leaving the tube locally unconfined at the location where the edges come together and along the run of the tube immediately following said location.

14. The method of making tubing as defined in claim 13, and in which the tube is advanced longitudinally by power applied as a pushing force ahead of the region of heating by the low temperature flame jets and as a pulling force at a region beyond the location where the weld is made.

15. The method of making butt weld tubing which comprises forming a continuously traveling skelp into a tube blank having an open steam cleft, heating the tube blank with low temperature fuel gas flames having a temperature of the order of about 3,000° F. projected on the edge portions of the blank and through the seam cleft between them, correlating the speed of travel of the tube blank with the heating of said low temperature fuel gas flames so as to raise the edge portions of the blank to a temperature of the order of 1450° F. while the body of the tube blank opposite the seam cleft is heated to a substantially lower temperature not higher than about 800° F., hot working the edge portions of the tube blank, beyond the region of the low temperature fuel gas flames, to form flat faces substantially parallel to a common radial plane that passes through the seam cleft and the longitudinal axis of the tube blank, heating the substantially parallel edge faces with oxy-fuel gas flame jets that raise the edge faces to a welding temperature, applying external pressure to the tube blank at locations along the high temperature flame jets but short of the end of the region of heating by said high temperature flame jets, and by such pressure gradually narrowing the seam cleft until the edges meet in welding engagement with each other beyond the locations at which said external pressure is applied, and leaving the tube blank free of local external, confining pressure at the region where the edges meet and along the run of the tube from said region to a point substantially beyond the last of the high temperature flame jets.

16. The continuous method of making butt weld tubing as described in claim 15, and in which the tube is advanced by force applied to the outside of the tube ahead of the low temperature flame jets and by other force applied to the outside of the tube beyond the region at which the weld is complete, and leaving the tube blank free of any propelling force between the force that is applied ahead of the low temperature flame jets, and the force that is applied beyond the region of the weld.

17. The method of making butt weld tubing which comprises forming a continuously moving strip of skelp into a tube blank having an open seam cleft and a cross section of greater length in the direction of an axis through the seam cleft, preheating the tube blank with low temperature fuel gas flames having a temperature of the order of about 3,000° F. and applied to the edge portions of the blank along a substantial run of the tube blank, correlating the speed of longitudinal movement of the blank with the heating of said low temperature fuel gas flames so as to raise the edge portions of the tube blank to a temperature in excess of about 1,200° F. while leaving the body of the tube blank opposite the seam cleft at a substantially lower non-glowing temperature and with resilience that controls the width of the seam cleft during passage of the tube blank through subsequent roll passes, advancing the tube continuously beyond the low temperature fuel gas flames and into a zone in which the edge portions of the tube blank are heated by oxy-fuel gas flames of substantially higher temperature than the melting point of the metal, said zone being of sufficient length to cause the edge faces of the tube blank to be heated to a welding temperature, confining the tube blank in roll passes while in said zone and by said roll passes narrowing the width of the seam cleft progressively as the cleft advances along said zone, and bringing the edges of the tube blank together at a point beyond the last of the confining roll passes of said zone so as to make the weld at a region where the tube blank is free of local confining forces.

18. The continuous method of making butt weld tubing as defined in claim 17, and in which the tube blank is left free of any externally applied driving forces along the region of preheating and while passing through the zone in which the oxy-fuel gas flames are applied to the edge portions of the tube blank, and the tube is advanced by rolling pressure applied to the outside of the tube blank and to the surface of the weld at a region beyond the weld.

19. The method of making butt weld tubing which comprises forming a continuously moving flat ferrous metal skelp into a tube blank having an open seam cleft, preheating the tube blank by applying low temperature fuel gas flames having a temperature of the order of about 3,000° F. to the edge portions of the blank and into the seam cleft between said edge portions, correlating the speed of the tube blank with the heating of the low temperature fuel gas flames so as to heat the edge portions to a temperature in excess of about 1,200° F. while restricting the temperature of the tube blank opposite the seam cleft to a substantially lower, non-glowing temperature which leaves the metal of the tube blank resilient, advancing the tube blank progressively beyond the low temperature fuel gas flames and into a zone in which the edge portions of the tube blank are exposed to high temperature oxy-fuel gas jets of a temperature substantially higher than the melting point of the metal, confining the tube blank to control the seam cleft width as the tube blank passes through said zone, reducing the width of the seam cleft progressively and bringing the edges of the tube blank into contact at a region beyond the last point of confinement in said zone so that the weld is made at a region where the tube is locally unconfined, leaving the tube locally unconfined from the region of the initial contact of the seam edges to a point at which any fused metal of the weld is solidified, and advancing the tube past the low temperature fuel gas flames and through the zone of high temperature heating by pushing the tube from in front of the low temperature fuel gas flames and by pulling the tube from a region beyond the point at which the weld is made, and leaving the tube free of any propelling force along the run of the tube that is being heated by the low temperature flame jets and along the zone of high temperature flame jet heating.

FRANK J. KENNEDY.

REFERENCES CITED

The following references are of record in the file of this patent:

UNITED STATES PATENTS

| Number | Name | Date |
| --- | --- | --- |
| 1,402,996 | Anderson | Jan. 10, 1922 |
| 1,402,997 | Anderson | Jan. 10, 1922 |
| 1,481,887 | Berg | Jan. 29, 1924 |
| 1,491,128 | Berg | Apr. 22, 1924 |
| 1,650,607 | Cook | Nov. 29, 1927 |
| 1,706,393 | Fay | Mar. 26, 1929 |
| 1,765,368 | Frahm | June 24, 1930 |
| 1,893,926 | Anderson | Jan. 10, 1933 |
| 2,960,523 | Anderson | May 29, 1934 |
| 1,996,775 | Sims | Apr. 9, 1935 |
| 1,997,538 | Armstrong | Apr. 9, 1935 |
| 2,024,485 | Sussman | Dec. 17, 1935 |
| 2,037,608 | Walker | Apr. 14, 1936 |
| 2,052,862 | Armstrong | Sept. 1, 1936 |
| 2,131,701 | Achterfeldt | Sept. 27, 1938 |
| 2,265,129 | Darner | Dec. 9, 1941 |
| 2,277,473 | Anderson | Mar. 24, 1942 |
| 2,414,874 | Herbst | Jan. 28, 1947 |

FOREIGN PATENTS

| Number | Country | Date |
| --- | --- | --- |
| 430,592 | Great Britain | June 21, 1935 |
| 552,126 | Great Britain | of 1943 |